July 23, 1946.  F. L. SARGENT ET AL  2,404,534
TIRE RACK
Filed June 8, 1945  2 Sheets-Sheet 1
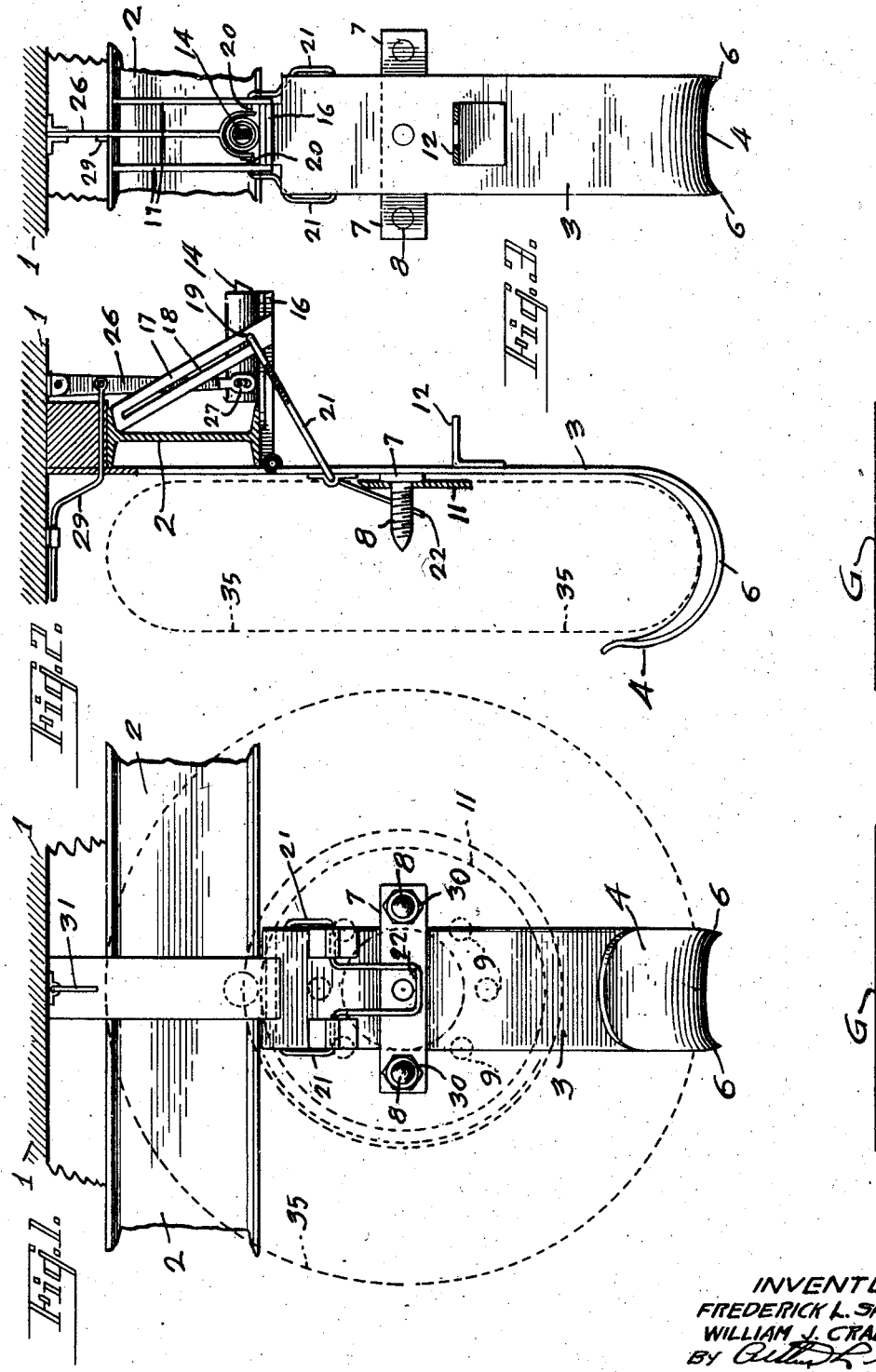
INVENTORS
FREDERICK L. SARGENT
WILLIAM J. CRADER
BY
ATTORNEY.

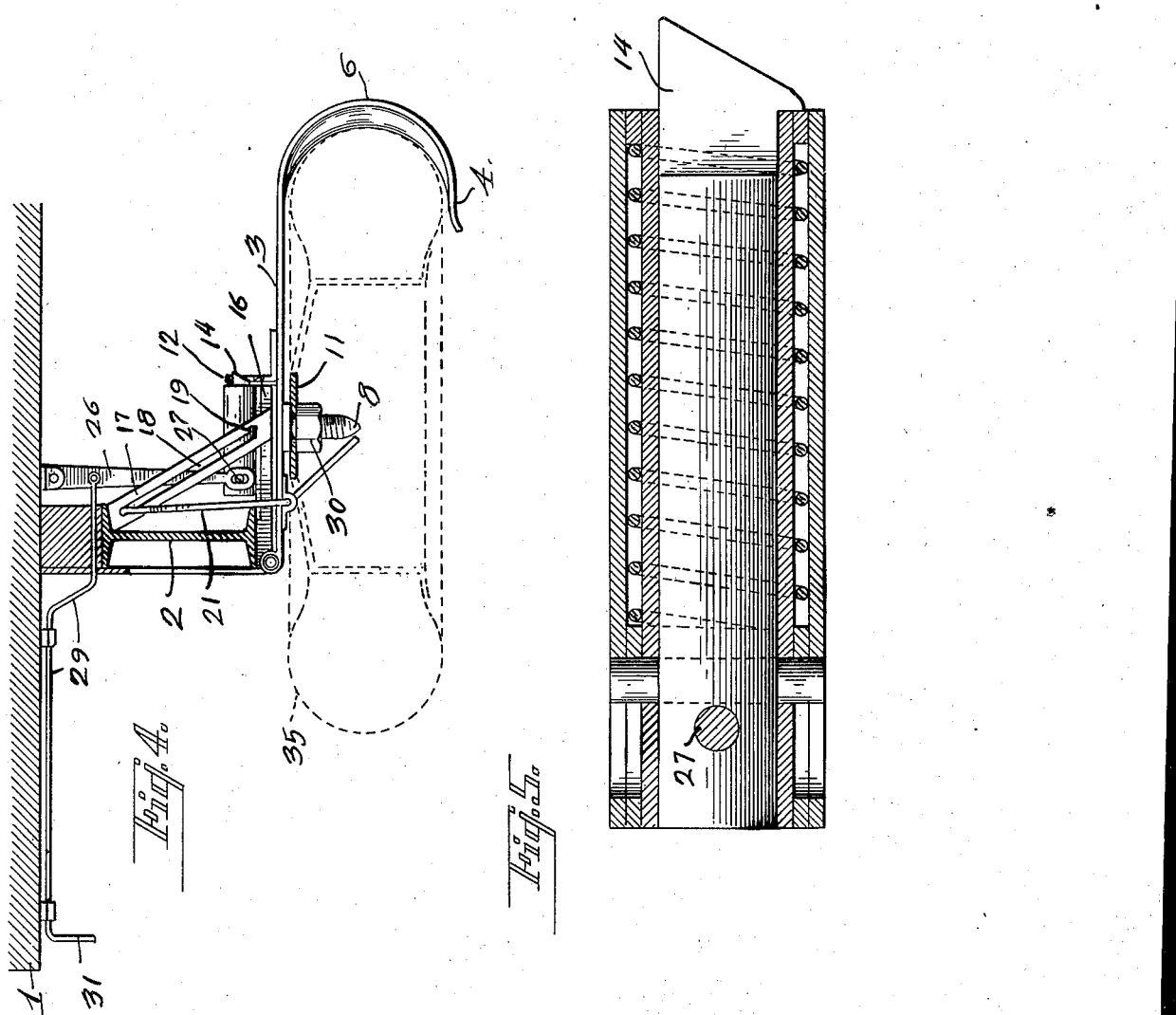

Patented July 23, 1946

2,404,534

REISSUED

UNITED STATES PATENT OFFICE 2,404,534

TIRE RACK

Frederick L. Sargent, Burlingame, and William J. Crader, Mountain View, Calif.

Application June 8, 1945, Serial No. 598,248

1 Claim. (Cl. 224—29)

The present invention relates to improvements in a tire rack for motor vehicles and more particularly to that type of rack for holding ponderous tires used upon heavy trucks and trailers, wherein a stirrup pivotally suspended to a low level to facilitate loading or unloading of a bulky tire, operates in conjunction with releasable means for holding said rack in vertical or loading position and also with means for swinging and locking said rack and tire to a higher elevation without lifting the entire weight of said tire.

The primary object of the present invention is to provide a new and improved tire rack.

Another object is to provide a new and improved rack of the character set forth having a greatly simplified construction for swinging a ponderous tire from a low to a higher elevation and locking the same in such elevation.

A further object is to provide a new and improved tire rack of the type described arranged to facilitate loading and unloading of cumbersome and ponderous commercial truck and trailer tires within the low and comparatively restricted and inaccessible area beneath a truck or trailer body and between the chassis and extensive overhang of the body usually found in vehicles of the heavy commercial type.

We accomplish these and other objects by means of the improved device disclosed in the drawings forming a part of the present application, and in which—

Fig. 1 is a broken elevation of a portion of one side of a truck or trailer body, with the device shown in loading position;

Fig. 2 is a side elevation of Fig. 1, with the tire securing nuts removed;

Fig. 3 is a rear elevation of Fig. 2;

Fig. 4 is an elevation similar to Fig. 1 but showing the rack and tire swung and secured in carrying position; and Fig. 5 is an enlarged longitudinal sectional view of one form of latch or bolt which may be used for locking the rack in receded position.

Referring to the drawings:

The numeral 1 is used to designate in general a portion of a heavy commercial truck or trailer body supported upon the usual beam or channel forming a part of the chassis 2.

From the chassis 2 is pivotally suspended a a stirrup 3 having a U-shaped lower end 4 flared at its edges as at 6 to facilitate rolling a ponderous tire 35 onto said stirrup 3. The stirrup 3 is also provided with a pivotally mounted transverse bar 7 having tapered and threaded lugs 8 thereon for engaging the usual bolt-holes 9 within a tire mounting 11.

A lateral apertured hasp 12 is mounted upon the rear of the stirrup 3 and is arranged to be automatically engaged and held by a spring bolt or latch 14 when the stirrup 3 is swung upwardly on its pivot to a horizontal or storing position, as fully disclosed in Fig. 4 of the drawings. The latch 14 is preferably mounted upon a lateral shelf 16 on the chassis 2 and further supported by brackets 17 having longitudinally disposed slots 18 therein with offset portions 19 in the lower ends thereof, said slots being slidably engaged by the lateral or inwardly turned ends 20 of a preferably U-shaped brace 21 pivotally mounted upon the stirrup 3 and having an extension 22 by means of which said brace 21 may be released from the offset portions 19 of the slots 18, in a manner and for a purpose hereinafter more fully set forth.

An arm 26 is pivotally suspended from the body 1 and directly above the latch 14 and is provided on the lower end thereof with a slotted and bifurcated end to straddle the latch 14 and engage a releasing pin 27 extending through said bolt or latch 14. Also, a releasing rod 29 is slidably mounted upon the lower or under side of the body 1 and has its inner end pivotally connected to the arm 26, and its outer end terminating in a lateral extension or handle 31 immediately adjacent the side of the body 1, as disclosed in Fig. 4 of the drawings.

In operation; with the stirrup 3 vertically suspended as in Fig. 1 of the drawings, one edge of a ponderous tire 35 is raised and laid upon or rolled into the U-shaped end 4 of the stirrup 3, so that an operator, within the comparatively restricted area under a body 1 and between the chassis or frame 2 and outer side or edge of the body 1, will not be compelled to lift the entire weight of said tire. Having rested one edge of the tire 35 upon the U-shaped portion 4 of the stirrup 3, the tire 35 is then raised vertically and the bolts 8 are inserted into the nearest holes 9 of a tire mounting 11, the bar 7 mounting said bolts 8 being pivotal so that the bolts easily may be adjusted to the holes rather than the more laborious method of turning the heavy tire to bring the holes 9 into matching relation with said bolts 8, as shown schematically in Fig. 1 of the drawings.

After the nuts 30 are screwed upon their respective bolts 8 the tire 35 and stirrup 3 are pulled forwardly until the ends 20 of the brace 21 are out of the offset portions 19 of the slots 18 of the braces 17, which brace 21 has been holding the stirrup 3 against backward movement while being loaded. The extension 22 of said brace 21, which normally extends through the central or axle opening of the tire mounting 11, is now pressed by the foot of an operator or otherwise to move the ends 20 of the brace 21 upwardly into the slots 18 and beyond the offset portions 19 thereof, so that the stirrup 3 and tire 35 thereon may now be swung upwardly to a horizontal position and until the latch or bolt 14 engages and holds the hasp 12, as fully disclosed in Fig. 4 of the drawings. In this carrying position, the tire is held beneath the truck body 1 out of danger from collisions and sufficiently clear of the roadway below.

When it is desired to unload a spare tire 35 from the rack, by pulling the handle 31 of the rod 29 outwardly, the latch or bolt 14 is receded or withdrawn from the apertured hasp 12 and the stirrup 3 and tire 35 will be moved automatically by the attraction of gravity to a substantially vertical or unloading position, as clearly disclosed in Figs. 1 and 2 of the drawings. In these figures it will be observed that the ponderous tire 35 has been lowered closely to the ground, as represented by the line G, so that with little effort the said tire may be removed and rolled off the side of the U-shaped portion 4 of the stirrup 3 and onto the ground G.

Having described our invention, we claim:

A tire rack comprising the combination with a vehicle body of a stirrup pivotally suspended from the chassis of said body; tapered and threaded lugs adjustably mounted upon said stirrup and arranged to engage apertures within a tire mounting mounted upon said stirrup; a hasp mounted upon the back of said stirrup; a latch arranged to engage said hasp and retain the same to hold said stirrup in a horizontal position from its pivot when said stirrup is swung to such position; means extending from said latch to the side of said vehicle body for releasing said latch; and releasable means for holding said stirrup in suspended vertical position.

FREDERICK L. SARGENT.
WILLIAM J. CRADER.